United States Patent
Mula et al.

(10) Patent No.: US 12,373,902 B1
(45) Date of Patent: Jul. 29, 2025

(54) BARMASTER STANDALONE DRINK MONITORING SYSTEM

(71) Applicants: Paul S Mula, San Jose, CA (US); Scott C Harris, Rancho Santa Fe, CA (US)

(72) Inventors: Paul S Mula, San Jose, CA (US); Scott C Harris, Rancho Santa Fe, CA (US)

( * ) Notice: Subject to any disclaimer, the term of this patent is extended or adjusted under 35 U.S.C. 154(b) by 0 days.

(21) Appl. No.: 18/781,026

(22) Filed: Jul. 23, 2024

(51) Int. Cl.
| | |
|---|---|
| *G06Q 30/04* | (2012.01) |
| *G01G 19/414* | (2006.01) |
| *G06Q 20/20* | (2012.01) |
| *G06Q 50/12* | (2012.01) |
| *G06V 20/52* | (2022.01) |
| *G06V 40/12* | (2022.01) |

(52) U.S. Cl.
CPC ......... *G06Q 50/12* (2013.01); *G01G 19/4144* (2013.01); *G06Q 20/206* (2013.01); *G06Q 30/04* (2013.01); *G06V 20/52* (2022.01); *G06V 40/12* (2022.01)

(58) Field of Classification Search
CPC ...... G06Q 50/12; G06Q 20/206; G06Q 30/04; G01G 19/4144; G06V 20/52; G06V 40/12
See application file for complete search history.

(56) References Cited

U.S. PATENT DOCUMENTS

| | | | | |
|---|---|---|---|---|
| 4,961,533 A * | 10/1990 | Teller | ................ | G07F 5/18 705/28 |
| 5,603,430 A * | 2/1997 | Loehrke | ................ | B67D 1/1234 222/37 |
| 5,837,944 A * | 11/1998 | Herot | ................ | G01K 1/14 177/25.14 |
| 6,450,406 B2 * | 9/2002 | Brown | ................ | G06Q 10/087 235/375 |
| 8,954,347 B1 * | 2/2015 | Einfalt | ................ | G06Q 10/087 705/16 |
| 10,121,121 B1 * | 11/2018 | De Bonet | ................ | A47B 57/34 |
| 11,192,770 B1 * | 12/2021 | Volftsun | ................ | G06Q 20/0855 |
| 11,615,639 B1 * | 3/2023 | Klein | ................ | G06V 40/14 382/115 |
| 11,663,805 B1 * | 5/2023 | Tang | ................ | G06V 40/12 382/115 |
| 11,820,640 B1 * | 11/2023 | DeRaedt | ................ | G05B 19/042 |

(Continued)

FOREIGN PATENT DOCUMENTS

| | | | | |
|---|---|---|---|---|
| AU | 2014269972 B2 * | 5/2018 | ........... | B67D 1/0877 |
| CN | 113989984 A * | 1/2022 | | |

(Continued)

OTHER PUBLICATIONS

Press, F. (2023). Financial press: Amazon's palm-scanning payment tech will now be able to verify ages, too. Singer Island: Newstex. Retrieved from https://www.proquest.com/blogs-podcasts-websites/financial-press-amazons-palm-scanning-payment/docview/2816784942/se-2 (Year: 2023).*

(Continued)

*Primary Examiner* — Ashford S Hayles
(74) *Attorney, Agent, or Firm* — Scott C Harris, Esq

(57) ABSTRACT

A drink ordering and dispensing system. A drink is ordered, and placed into a database. When drinks are poured, their contents are automatically determined and they are added to the point of sale system, and the drink is popped up to the server, so that the server can associate that drink as poured to someone's bill.

19 Claims, 2 Drawing Sheets

(56) References Cited

U.S. PATENT DOCUMENTS

| | | | | |
|---|---|---|---|---|
| 11,992,143 | B1* | 5/2024 | Carter | A47G 29/141 |
| 2002/0070861 | A1* | 6/2002 | Teller | G06Q 20/20 |
| | | | | 340/568.1 |
| 2004/0133473 | A1* | 7/2004 | Anderson | G06Q 20/20 |
| | | | | 705/16 |
| 2005/0000737 | A1* | 1/2005 | Fox | G01G 17/04 |
| | | | | 177/245 |
| 2006/0238346 | A1* | 10/2006 | Teller | G01G 23/3735 |
| | | | | 340/572.1 |
| 2007/0228068 | A1* | 10/2007 | Schneider | G06Q 10/087 |
| | | | | 222/1 |
| 2008/0082360 | A1* | 4/2008 | Bailey | G06Q 10/06 |
| | | | | 705/28 |
| 2008/0147211 | A1* | 6/2008 | Teller | G06Q 30/06 |
| | | | | 700/90 |
| 2008/0195251 | A1* | 8/2008 | Milner | B67D 3/0077 |
| | | | | 222/1 |
| 2009/0261974 | A1 | 10/2009 | Bailey | |
| 2010/0037985 | A1* | 2/2010 | Waters | B65B 3/06 |
| | | | | 141/83 |
| 2011/0180563 | A1* | 7/2011 | Fitchett | G01F 13/00 |
| | | | | 222/23 |
| 2011/0313871 | A1* | 12/2011 | Greenwood | G06Q 20/10 |
| | | | | 705/16 |
| 2012/0261468 | A1* | 10/2012 | Hecht | G07F 9/026 |
| | | | | 235/380 |
| 2014/0163725 | A1* | 6/2014 | Wilinski | G06Q 50/12 |
| | | | | 700/237 |
| 2014/0351068 | A1* | 11/2014 | Renfroe | G06Q 30/0641 |
| | | | | 705/15 |
| 2015/0020181 | A1* | 1/2015 | Iwata | G06F 21/32 |
| | | | | 726/7 |
| 2015/0287006 | A1* | 10/2015 | Hunter | H04L 67/56 |
| | | | | 705/21 |
| 2015/0375984 | A1 | 12/2015 | Arcand | |
| 2017/0135519 | A1* | 5/2017 | Deng | G07F 13/025 |
| 2017/0156619 | A1 | 6/2017 | Couderc | |
| 2017/0275147 | A1* | 9/2017 | Moezidis | B67D 1/0888 |
| 2018/0247283 | A1* | 8/2018 | Milici | G06Q 20/327 |
| 2018/0349848 | A1* | 12/2018 | Edwards | G01G 19/4148 |
| 2019/0072424 | A1* | 3/2019 | Clément | G01G 19/00 |
| 2019/0164115 | A1* | 5/2019 | Alexander | H04L 67/125 |
| 2019/0197466 | A1* | 6/2019 | Hand, III | G06V 20/00 |
| 2019/0213607 | A1 | 7/2019 | Eppley | |
| 2019/0303864 | A1 | 10/2019 | Edwards | |
| 2020/0247661 | A1* | 8/2020 | Rao | G05B 19/41875 |
| 2021/0125139 | A1* | 4/2021 | Gregory | G06F 9/542 |
| 2021/0221667 | A1 | 7/2021 | Venkatakrishnan | |
| 2021/0253415 | A1* | 8/2021 | Nolan | B67D 3/0077 |
| 2021/0374836 | A1 | 12/2021 | Bronicki | |
| 2021/0403309 | A1* | 12/2021 | Patel | H04N 23/54 |
| 2022/0051188 | A1* | 2/2022 | Stoodley | G06F 16/22 |
| 2022/0230216 | A1* | 7/2022 | Buibas | G06V 10/454 |
| 2023/0124838 | A1* | 4/2023 | Groff | G06Q 20/3276 |
| | | | | 705/28 |
| 2023/0206290 | A1* | 6/2023 | Huang | G06V 20/44 |
| | | | | 705/400 |
| 2023/0325905 | A1* | 10/2023 | Locke | G06Q 20/208 |
| | | | | 705/23 |
| 2023/0401884 | A1* | 12/2023 | Ashimine | H04N 23/56 |
| 2024/0070765 | A1 | 2/2024 | Yahata | |
| 2024/0241587 | A1* | 7/2024 | Lv | G06F 3/017 |
| 2024/0257562 | A1* | 8/2024 | Yuan | G06V 40/60 |
| 2025/0022309 | A1* | 1/2025 | Yang | G06V 40/1365 |

FOREIGN PATENT DOCUMENTS

| | | | | | |
|---|---|---|---|---|---|
| CN | 118044704 | A | * | 5/2024 | |
| GB | 2369347 | A | * | 5/2002 | B67D 1/06 |
| GB | 2503259 | A | * | 12/2013 | B67D 1/06 |
| GB | 2512050 | A | * | 9/2014 | A47G 19/2227 |
| JP | 2018106580 | A | | 7/2018 | |
| JP | 3242453 | U | | 6/2023 | |
| WO | WO-2016141322 | A1 | * | 9/2016 | |
| WO | WO-2019158563 | A1 | * | 8/2019 | B67D 1/06 |

OTHER PUBLICATIONS

U.S. Appl. No. 10/223,683, filed Mar. 5, 2019, Saverio Dalia.

* cited by examiner

BARMASTER STANDALONE DRINK MONITORING SYSTEM

BACKGROUND

Restaurant style point-of-sale systems can take or receive an order from a user in a restaurant, and maintain the bill for that order.

Many different systems of this type are known, including handheld systems that wirelessly communicate to another location.

US 2009 0261974, describe a system that wirelessly monitors inventory in the dispensing of items.

SUMMARY OF THE INVENTION

The inventors recognized that there are a number of drawbacks with the current systems and have recognized ways to improve the process of inventory management beyond those described in previous patent applications.

Embodiments describe an inventory management system for a drink dispensing system, including a drink measure system and a video management system, all managed via a video and inventory manager which also includes an automatic order creating system based on a drink that was dispensed by a server.

An embodiment describes a device that automatically pops up drink orders to a server on the point-of-sale system that is managed and monitored by video equipment.

BRIEF DESCRIPTION OF THE DRAWINGS

In the Drawings:
the figures show aspects of the invention, and specifically.

DETAILED DESCRIPTION

The present application describes a system for monitoring the dispensing of products in a sales establishment, and attempting to verify that charges that are entered for the items that are served by servers.

An embodiment describes monitoring the dispensing of alcoholic drinks. However, it should be understood that this system can be used to monitor different products in different environments including food, non alcoholic drinks, as well as other items that are sold and dispensed in an environment, including, as in an embodiment, a restaurant environment.

An embodiment automates the adding of the drinks to the user's tab. This

An embodiment describes monitoring the dispensing of alcoholic drinks from bottles. However, it should be understood that this system can be used to monitor different products in different environments including food, non alcoholic drinks, as well as other items that are sold and dispensed in an environment, including, as in an embodiment, a restaurant environment.

Figure 1:
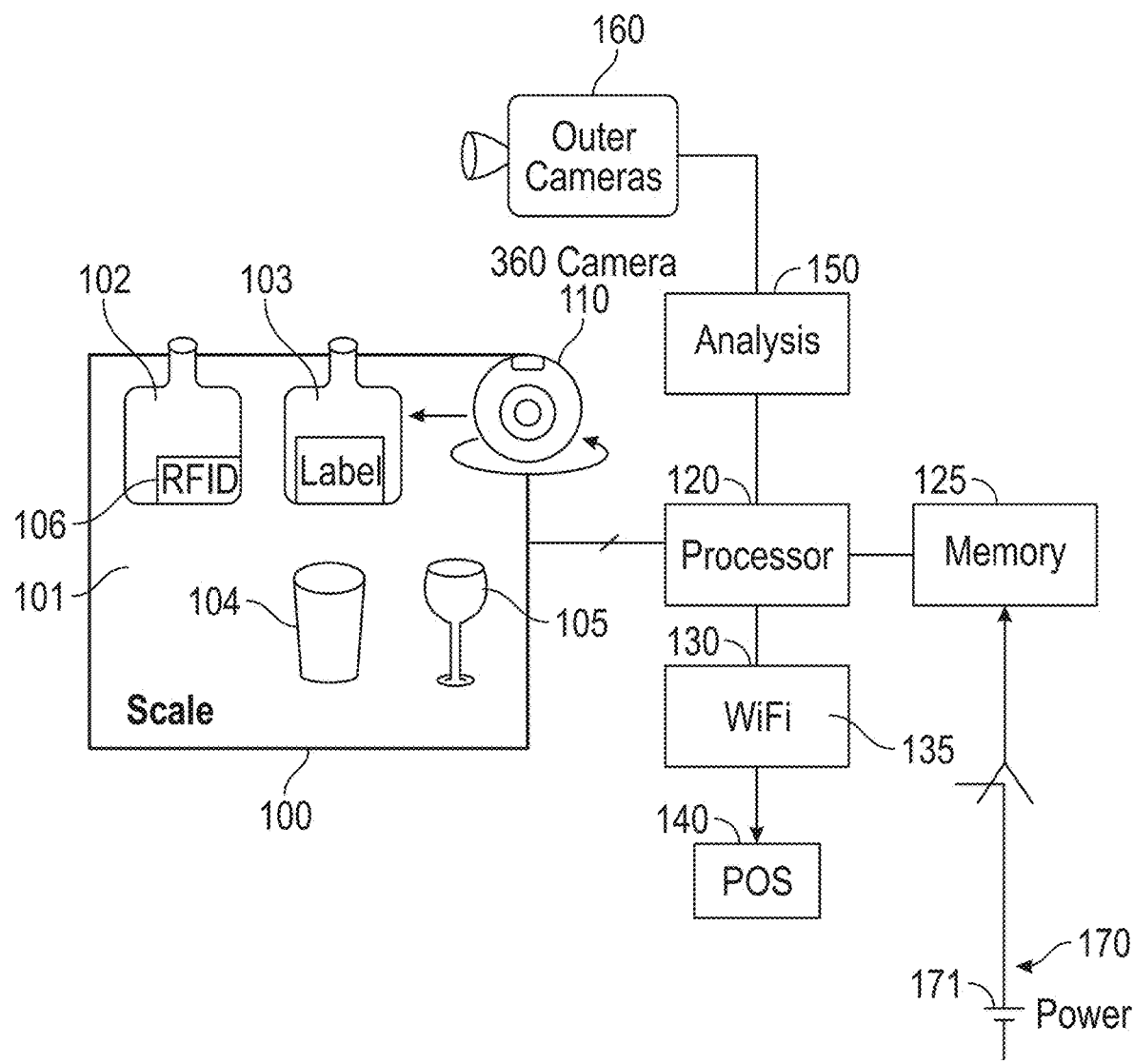
FIG. 1 shows a block diagram of a drink dispensing system.

An embodiment of the overall hardware used according to the present system is shown in FIG. 1. This provides an inventory management system using modular components that provide and store data, and coordinate the information thus received.

The block diagram of FIG. 1 shows the hardware version of the system. A scale assembly 100 is a modular device which can be added to a restaurant point of sale or bill management system. The scale assembly 100 includes a top surface 101 on which a number of serving containers, including bottles such as 102, 103, and also glasses, are stored. The scale assembly measures the weight of the containers and glasses these containers.

In an embodiment, the bottles can be identified using an RFID reader which reads a corresponding tag 106 on bottles to determine the contents of the bottles.

In another embodiment, one or more cameras are used to image the different containers on the scale surface, and compare those containers with a database of containers appearances. For bottles, this can determine the contents and brand of each bottle from bottle's appearance.

The system includes one or more cameras which are used to monitor the drink pouring operation, determine who is doing the pouring, and maintain video evidence of certain events.

360 camera 110 receives images from an area of the scale assembly, and all areas around the scale assembly. In one embodiment, this can be a single 360 camera located at a corner of the assembly. In another embodiment, this can use multiple different cameras, which can be located for example on a top surface or an edge surface of the scale assembly 100.

All of the information obtained by all of the subsystems is sent to the processor 120, which processes and stores the information as described herein. The processing of the information can create a database stored in memory 125.

The system can also communicate using a wireless communicator 130, e.g, over wifi, with devices that are ancillary to the modular device. In particular, this can communicate with point-of-sale units 140 in the establishment which are used to receive and coordinate obtaining the information from the POS units.

The communication can also communicate with an analysis station 150 which as described herein can be used to analyze the video at times when problems have been identified.

This can also communicate with one or more other cameras 160, such as cameras which may be located throughout the establishment to provide additional views of video during times of inventory mismatches.

The communicator 130 can also communicate with the Internet, to receive updates to the program used to operate the system, to backup the memory database to a cloud backup server, for example, and to receive updated information on different bottles to use in matching to the bottle database.

External power 170 is provided to the device, which can also charge an internal battery 171 allowing the device to operate off of battery power as needed.

Figure 2:
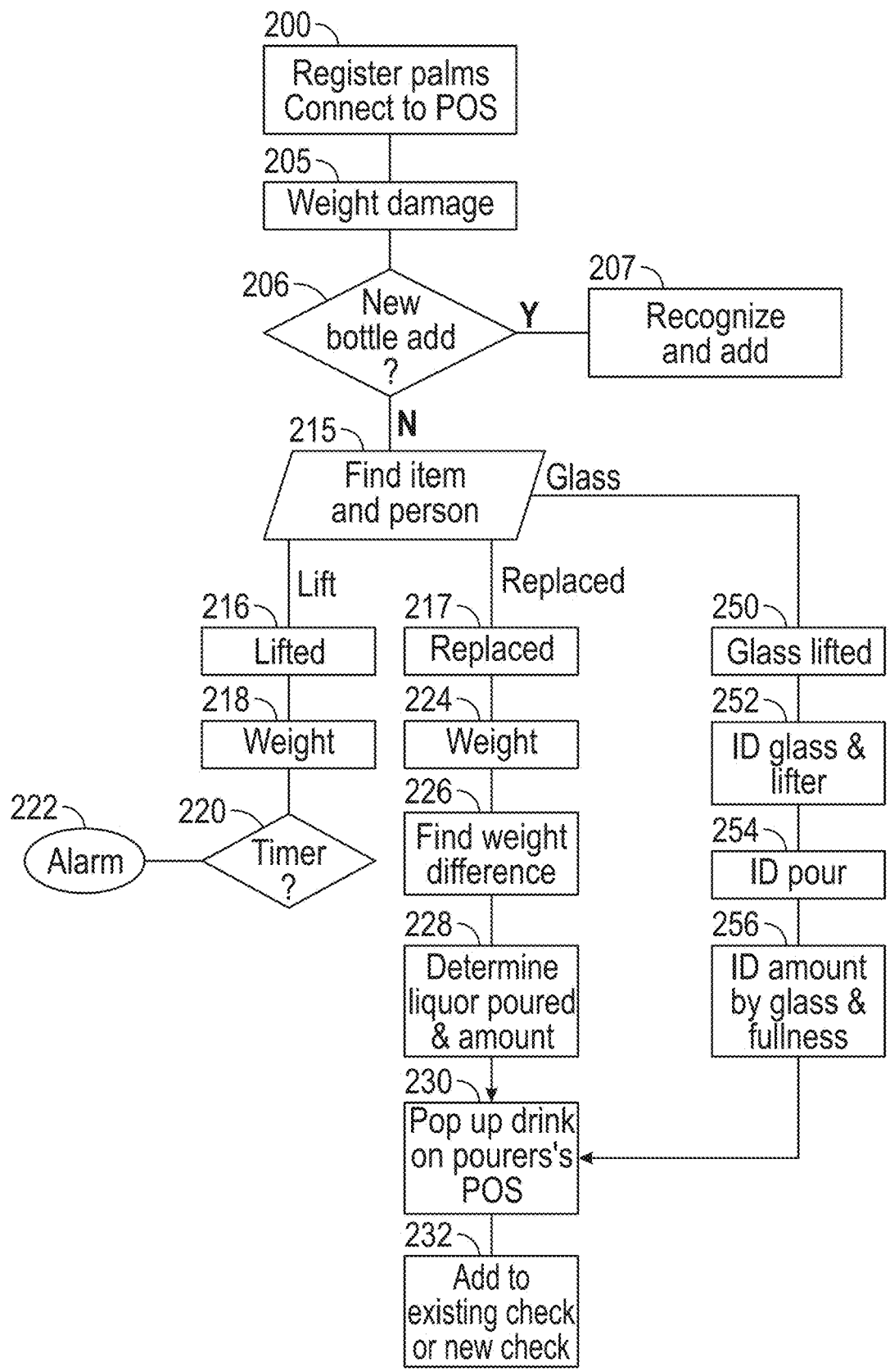
FIG. 2 shows a flowchart of operation of the system to pop up drink order on to a POS system.

The processor 120 may run and/or control according to the flowchart of FIG. 2.

In an embodiment, the system identifies specific servers, who are serving drinks to customers in an embodiment. This can use any kind of biometric identification, since the camera or cameras 110 are preferably set to image the entire area around the scale assembly that holds the bottles. In one embodiment, this uses a palm identification system, such as Amazon One™ which identifies a specific person from the look of their hand.

Initial configuration and startup occurs at 200. Servers initially register their palms at 200. Each time a user serves a drink, they do so by reaching over the scale assembly, and therefore reaching into the field of view of the camera 110. As the hands go over the assembly, this is identified by the Palm identification system. The user eventually touches and removes a container. In an embodiment, this is a bottle. This causes a weight change on the surface of the scale. In this way, the system automatically identifies not only that a bottle has been removed from the scale (and later replaced on the scale) but also the specific person who did the removing (and replacing).

The system initial startup also matches to one or more point-of-sale terminals. Once a point-of-sale terminal is associated with the e scale device, it may be maintained in the memory of the scale device, and used during subsequent startups. This can associate a dedicated point-of-sale terminal to the device. In another embodiment, this can use an app on a user's phone as a point-of-sale device. If the phone is used, this can use the phone to scan a code at 210, confirm the message, and register the user of the device's palms.

In one embodiment, once a server has been associated with the system, the server's future work hours can be entered into the system so that the system recognizes the server as authorized only during those work hours. This is done when the server's work hours are loaded into an electronic calendar. The servers will work hours are used to set the system so that the server point-of-sale system and ability to serve drinks is valid only during the hours that the server is working.

In this embodiment, multiple different bottles and glasses are kept on the same surface 101 of scale 100. The bottles, and their weights and other information about the bottles are stored in the database. Any time a container is removed or replaced, the weight measured by the scale changes and the system automatically operates to find the results of the change.

At 205, the system starts its main operation by looking for a weight change on the scale. For this embodiment, the container will be described as a bottle. Depending on what happens, this can signify a container or bottle lifted, a bottle replaced, a new bottle added, or a bottle discarded. In general, all of these actions are referred to as a bottle change.

At 206, the system recognizes a bottle being added. This can be triggered when there is a weight increase, without a previous decrease. It can also be manually signified, e.g., with an "add bottle" control, or can be determined by monitoring the camera.

For example, this may be a bottle of vodka. The system recognizes the look of the bottle of vodka from its own database of internal alcohol devices. A new bottle, e.g., a full bottle can be placed on the scale. This will have a weight near or at the weight of the full bottle. Any of these things can be used to recognize a new bottle. The look of the bottle is recognized at 207.

Alternatively, if the scale is holding glassware, then the system can recognize a glass being added at 206.

If the weight change is not a new bottle at 206, then at 215, the camera 110 is used to find which existing bottle has been changed. This is done by matching the look of the bottle that has been moved, as identified by the camera, to looks that are stored in the system. Each bottle will have a unique look including its color, bottle shape, and label shape and color. These looks can change from time to time, and are periodically downloaded as an system update, so that the memory 125 stores an updated list of all looks of all bottles that are authorized to be sold within the bar. This can be selected by the manager, who decides what bottles or what alcohol is being sold in the bar, and set as one of the initial parameter registrations done at system startup.

The handler of the bottle is also determined at 215 by their biometric look, here their palm identification.

Similarly, when a glass is removed, the type of glass that was removed, as well as the person who removed the glass, can be recognized by their palm recognition.

At 216, a bottle lift event is determined based on the finding that the weight has been reduced on the scale, and finding a bottle lifted using the camera. The bottle replace event is found at 217, by finding the weight being increased. The camera continuously records, so a preroll of the camera footage is used to recognize the specific bottle being replaced.

The bottle lift event at 216 begins the process of pouring a drink.

The bottle weight is found at 218, from the difference in weight before and after lifting In one embodiment, as 220, this can start a timer, within which the pourer needs to finish pouring the drink and return the bottle to the surface. The system monitors the scale to see if the bottle has been replaced. If the bottle is not replaced, the system monitors to see if the timer is elapsed, and if so sets an alarm at 222 which can cause an audible beep to prompt the user to replace the bottle, and can also cause video of this whole scenario to be stored for later review. However if the bottle is replaced, a replace event is found at 217, satisfying the timer.

The bottle replace weight is found at 224, and a difference between the bottle removed weight and the bottle replaced weight is obtained at 226. This sets the specific weight of the drink that was poured, which sets the amount of poured liquor.

At 228 the system uses the camera detection to determine the specific liquid that was poured, and the weight reduction of that liquid to determine the specific drink poured. So, from 228, the person who poured the drink is known, the alcohol is known, and the amount of alcohol that was poured is known. The system automatically calculates what drink has been poured from this information.

At 230, the system uses the drink and pourer, and sends a message to the pourer's point of sale, with details of the drink that has been poured. The system queries the pourer to either add this to an existing check or create a new check at 232. In this way, the drink dispensed is popped up to the user, and automatically added to the point of sale system.

The above has described using this for monitoring bottles and the contents of bottles. This system can also be used to monitor the contents of the glasses itself. In this embodiment, beer and wine glasses such as 104, 105 can be stored on the scale surface 101. Other type glasses can also be stored including glasses for alcoholic drinks.

When the user lifts a beer or wine glass, 215 detects that a glass is lifted, by the weight change on the scale by an amount of a glass, and/or by using the camera output. This signals that a glass, e.g., 104 has been lifted at 250. This initiates the beer or wine glass lifted routine.

The lifter is identified using their Palm identification at 252. The specific glass is identified, to determine if the glass is a beer or wine glass size also at 252.

At 254, the pour is identified, using the camera to image the area of the pouring, and identify the contents of the pour. This can identify the pour being, for example, a draft beer, a beer can or bottle, or a wine bottle. The camera can identify each of these pours.

In an alternate embodiment, once the kind of glass is IDed, the system knows if the pour is going to be a beer or wine, and use the camera to determine specifics.

For example, if the pour is of Michelob beer, this can be seen by the camera and automatically detected to identify the pour as being of Michelob.

After the pour, the amount of the pour can be determined by the camera imaging the fullness of the glass at 256.

After the pour has been completely identified in this way, the information is passed to 230 which uses the identified information to create an entry pops up a prompt to use to the server, saying you have poured X, add to a new check or existing check?Do you want to add this to your bill. The database automatically populates the bill in this way.

The system as described herein can operate with any kind of existing or new point of sale system for ordering items such as drinks in a bar, maintaining the invoices for the individual patrons based on their orders, and generating those invoices. Existing systems of this time are sold by companies such as Toast™

IT is also contemplated that a version of the front end system or the backend system can be stored on the processor 120, with the memory 125 forming the database that stores the information obtained by the processor. By doing so, this provides the ability for a standalone system to be quickly put into service and interfaced with cellular telephones or any other handheld computer that is capable of running an app and has communication capability.

This standalone system substantially simplifies the ordering technique, by allowing the poor to automatically add an item to the bill every time they poor. The pouring operation automatically prompts the poor to add it to someone's bill, thus facilitating this operation.

In embodiments, many more weighing stations may be expected.

In alternative embodiments, the information read from the unique liquor bottle can be a unique identifier such as an RFID tag. The unique identifier is associated with the bottle weight and contents in the datebase. In other embodiments, the unique identifier can include a barcode, or a hologram uniquely identifying the bottle, so that the identification and the bottle and its weight can be sent from each scale at each time to the server.

The flowcharts shown in the figures can be carried out on one or more of the computers, and can be carried out on a cloud computing based system, or a distributed flowchart carried out using multiple different systems, for example individual users with phones or terminals such as point of sale system or comparable terminals having their apps carry out parts of the system operation which then communicate with a central database. Different parts of this invention can be used individually.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A drink order maintaining and billing system, comprising:
    a point of sale computer which creates orders which are placed by customers for drinks which are poured by a server;
    a drink computer storing a database of drinks which have been ordered; and
    an electronic scale, having a surface storing plural drink dispensing items thereon;
    a camera that images an area in which drinks are dispensed and creates an output indicating images or videos of the area;
    the drink computer determining a weight reduction indicating that an item has been removed from the electronic scale and drink is being poured, and
    analyzing the output of the camera to determine a specific item being poured; and
    the drink computer determining, from the specific item, a drink which has been poured, and a biometric indication of a pourer of the drink as the pourer of the drink passes their hand over the electronic scale to obtain the drink, to the point of sale computer, an order for a drink poured using the specific item.

2. The system as in claim 1, wherein the computer detecting weight changes indicating that items have been removed from or replaced on the electronic scale, determining the drink from the weight change of the item, and determining the specific drink which is sent to the point of sale system from the weight change.

3. The system as in claim 2, wherein the drink is a liquor drink, and the weight change determines whether one shot or two shots of liquor has been poured.

4. The system as in claim 2, where the camera output is used to identify a pourer of the drink, by identifying biometric characteristics of the pourer of the drink, and where the drink is sent to the point of sale system associated with the pourer who is identified.

5. The system as in claim 1, wherein the point of sale computer receives information about the drink poured that is automatically received, and queries the pourer whether to add the drink to an existing bill or make a new bill.

6. The computer is in system as in claim 1, wherein the output of the camera is analyzed to detect if the drink poured is an alcoholic drink based on detecting a look of an alcohol bottle in the output of the camera, or whether the drink poured is a poured drink, by detecting a beer or wine glass in the output of the camera.

7. The system as in claim 1, wherein the weight change is analyzed to determine if the weight change corresponds to a weight change of a glass, or a weight change of an alcohol bottle, to determine if the drink poured is an alcoholic drink or a poured beer or wine drink.

8. The system as in claim 1, wherein the drink computer determines a poured beer or wine drink being dispensed, and uses the output of the camera to detect a fullness of a glass into which the beer or wine drink is being poured and uses the fullness of the glass to set the drink that is poured and sent to the point of sale computer.

9. A method of billing for a drink poured by a server, comprising:
    storing orders comprising orders which have been ordered by a customer, in a database of drinks stored in a memory and associated with a computer;
    using the database of drinks to create a bill for the customer based on the drinks that the customer has ordered;
    receiving information from an electronic scale into the computer, about a weight of containers kept on the electronic scale;
    detecting a reduction in the weight on the electronic scale and using the reduction in the weight to establish a lift event which indicates that a container on the electronic scale has been lifted from the electronic scale;
    using the computer for determining a specific container which has been lifted from the electronic scale;

using the computer for determining a specific server who has removed the container from the electronic scale;

using the computer for determining a specific amount of material which is served into using the specific container that was removed from the electronic scale; and based on determining the specific container that was removed and the specific amount of material that was served, using the computer to obtain a biometric indication of a pourer of the drink as the pourer of the drink passes their hand over the electronic scale to obtain the drink, and creating a new bill item for a new drink served to a customer and adding the new bill item for the new drink served to the customer by the server who removed the container from the electronic scale, to the database of drinks in the memory associated with the computer.

10. The method as in claim 9, wherein there is a camera imaging an area of the electronic scale, which creates an image output indicative of the area of the scale.

11. The method as in claim 10, wherein a specific item being lifted is detected by the camera.

12. The method as in claim 10, wherein the specific user who lifted the item from the electronic scale is detected by the camera using the biometric indication.

13. The method as in claim 11, wherein the specific amount of material which is served is detected by using a difference between a weight of the item when the item is removed and a weight of the item when the item is returned to the electronic scale.

14. The method as in claim 11, wherein the specific amount of material is detected by the camera output detecting a fullness of a glass.

15. The method as in claim 11, further comprising automatically detecting when a bottle has been lifted or when a glass has been lifted, and using a difference in weight to determine an amount of the drink when the bottle has been lifted, and using a fullness of the glass, from an output of the camera when a glass has been lifted is detected to have been lifted.

16. A drink order system, comprising:

a computer, storing a database of drinks which are poured for users;

a scale, holding on a weighing surface, a plurality of liquor bottles and a plurality of glasses into which wine and/or beer is to be poured;

a camera, imaging an area around the scale and creating a camera output indicative of the imaging;

the computer operating to determine a weight reduction on the scale, as a lift event, and to determine, using the camera output to determine if the lift event corresponds to lifting a liquor bottle, or lifting a glass;

and the computer automatically determining a drink which has been poured as being an alcoholic drink or a poured beer or wine drink depending on whether the lift event corresponds to lifting the liquor bottle or lifting the glass, and the computer obtaining a biometric indication of a pourer of the drink as the pourer of the drink passes their hand over the scale to obtain the drink.

17. The system as in claim 16, further comprising a camera imaging an area around the scale, and wherein the computer uses an output of the camera to image of the area around the scale to determine if the liquor bottle has been lifted or the glass has been lifted.

18. The system as in claim 17, wherein the computer uses the weight reduction and relates that to the weight of liquor bottles and the weight of glasses to determine a specific item that has been lifted.

19. The system as in claim 17, wherein the computer automatically determines, from the weight change between a container being removed from the scale and the container being replaced on the scale, a specific amount of the drink which has been poured, and automatically adds the drink to the database of drinks which are poured for the user, to bill the user for the drinks.

* * * * *